United States Patent [19]

Kreh et al.

[11] Patent Number: 5,022,926
[45] Date of Patent: Jun. 11, 1991

[54] CORROSION CONTROL

[75] Inventors: Robert P. Kreh; Joseph T. Lundquist, both of Jessup; Wayne L. Henry, Gaithersburg, all of Md.; John A. Kelly, Crystal Lake, Ill.; Vincent R. Kuhn, Twin Lakes, Wis.

[73] Assignee: W. R. Grace & Co.-Conn., New York, N.Y.

[21] Appl. No.: 353,231

[22] Filed: May 18, 1989

Related U.S. Application Data

[63] Continuation-in-part of Ser. No. 204,664, Jun. 12, 1988, abandoned.

[51] Int. Cl.$^5$ .............................................. B08B 3/08
[52] U.S. Cl. ........................................ 134/2; 134/3; 134/28; 134/41; 252/392; 252/393
[58] Field of Search .................. 134/2, 3, 41, 28; 252/392, 393; 422/15

[56] References Cited

U.S. PATENT DOCUMENTS

| | | | |
|---|---|---|---|
| 2,396,938 | 3/1946 | Bersworth | 252/392 |
| 3,898,037 | 8/1975 | Lange et al. | 252/392 |
| 4,124,500 | 11/1978 | Arghiropoulos et al. | 252/392 |
| 4,532,068 | 7/1985 | Fuchs et al. | 252/392 |
| 4,728,497 | 3/1988 | Muceitelli | 252/392 |
| 4,734,203 | 3/1988 | Lin et al. | 252/392 |
| 4,935,205 | 6/1990 | Kreh et al. | 252/392 |

FOREIGN PATENT DOCUMENTS

| | | | |
|---|---|---|---|
| 0192442 | 8/1986 | European Pat. Off. | |
| 7104286 | 3/1971 | Fed. Rep. of Germany | 252/392 |
| 5054533 | 9/1973 | Japan | 252/392 |

OTHER PUBLICATIONS

Proceedings-International Water Conference, Eng. Soc., Westchester, PA (1978) 39 299-308 (Eng).
Water-Formed Scale Deposits by J. C. Cowan et al., p. 277 (1976).
Bull. Chem. Soc. Jap. 36 (No. 11) pp. 1408-1411, J.A.C.S. 100:17 5362 (1978).
Clay Minerals (1977) 12 127. Med. Fac. Landbouww. Rijksuniv. Gent 42 (1977) 2025-2029.
Biermans, Med. Far. Landbouww. Rijksuniv. Gent. 42 (1977), 2025-2029.
Biermans, Clay Minerals (1977) 12, 127.
Murekami et al, Bull. Chem. Soc. Jap. (1963), vol. 36, 1408-1411.

*Primary Examiner*—Asok Pal
*Attorney, Agent, or Firm*—Beverly K. Johnson

[57] ABSTRACT

A method of removing iron contaminants in an aqueous system by introducing and maintaining within the system at least one ortho dihydroxyaromatic compound having at least one electron withdrawing group pendant from the aromatic ring and, further, a method of inhibiting calcium scale formation in the presence of iron contaminants by utilizing at least one dehydroxyaromatic compound in combination with calcium scale inhibitors.

30 Claims, No Drawings

CORROSION CONTROL

This is a continuation-in-part application of U.S. application Ser. No. 204,664 filed June 10, 1988, now abandoned.

BACKGROUND OF THE INVENTION

The present invention is directed to a novel method of removing iron contaminant formations commonly found in aqueous systems. The present method provides a means for dislodging and removing iron III scale formations which have formed in systems having iron and/or iron based alloy components in contact with the aqueous system.

The subject invention is directed to the use of a substantially non-toxic method of removing corrosion products of ferrous metals in contact with aqueous systems by effectively dislodging and removing these products from the system. The method described and claimed herein requires the use of at least one adjacent-paired or ortho-dihydroxy aromatic compound which further contains at least one electron withdrawing group pendant from the aromatic ring.

The present invention shall be described in terms of its utilization in conjunction with cooling water systems. However, the invention is not so limited but can be effectively used in conjunction with other aqueous systems which are in contact with iron base alloy material and, in particular, difficult to control systems which present conditions of elevated pH, high temperatures and/or high hardness levels such as boilers, heat exchangers and the like.

The dislodgement and/or removal of iron corrosion formation is essential in cooling water systems to cause the equipment to be free from obstruction and to produce an efficient system by maximizing flow rate and heat transfer. Iron(III) oxide scale is known to build-up in these systems and cause a marked decrease in their efficiency. The iron oxide scale is particularly troublesome because of its extremely low solubility in aqueous media and, therefore, deposits and builds up in the equipment to reduce the flow rate and impede the heat transfer. Thus, there is a need for additives which are capable of removing the iron scale and maintaining the system free of scale build-up. In order to effectively do this, the additive must be capable of dislodging and dissolving the iron oxide solids present in the system.

There are many means which have been suggested for iron scale removal. For a product to be useful under the conditions commonly found in cooling systems and the like, it must be capable of meeting the following combination of rigorous criteria:

1) dissolution of old rust scale;
2) dissolution of solids of iron(III) oxides and iron-(III) hydroxides which are materials normally insoluble in cooling water conditions of high pH and which normally is very hard water having high calcium and magnesium content;
3) capable of controlling the formation of new rust scale as iron(III) over a sustained period;
4) capable of removing the iron scale from the system without mere dislodgement of solids from its site of formation as such solids tend to be trapped at other locations of small dimension causing a clogging of the system;
5) utilize material or compositions which are stable under the adverse conditions presented, such as high pH (6.5-9.5), high temperature (e.g. 100°-175° F.) and/or hardness associated with the presence of excess calcium, magnesium and carbonate ions;
6) utilize material which is capable of remaining soluble under the adverse conditions presented;
7) not being a source of corrosion or of accelerating the corrosion of the system;
8) capable of complexing iron at low levels;
9) capable of enhancing the performance of threshold scale inhibitors in the presence of iron; and
10) capable of promoting the formation of protective oxide layers which render the metal surface passive to further corrosion.

It is readily seen that a means of achieving this combination of desired properties would find a high degree of acceptance in the control of iron scale in cooling water systems.

Scale prevention should be the primary goal for maintaining a clean system. However, inadvertent system upsets in pH, temperature, cycles of concentration, flow rate, etc., result in the formation of some iron scale which is not prevented by the normal maintenance dosage of conventional additives. Thus, there is a need for an additive which will remove iron oxide deposits which have been formed due to such upsets.

Classical methods for removing iron scale involve acid or mechanical cleaning. These are undesirable since they require costly shut down of the system being treated and lead to equipment degradation via corrosion and/or mechanical abrasion. A means for the removal of iron scale during normal operation of the cooling water system would present an improvement in economics, simplification of operation and minimize equipment degradation.

Polymeric additives have been used in an attempt to control iron scale in cooling water For example, U.S. Pat. No. 3,898,037 describes the dispersion of insoluble iron compounds with polymers of 2-acrylamido-2-methylpropanesulfonic acid. Sulfonated polymers have also been used for this purpose (Proc.-Int. Water Conf. Eng. Soc. West. Pa. 1978, 39, 299). These dispersants are capable of preventing iron oxide solids from depositing. They do not, however, dissolve iron(III) oxides and are not effective in removing hardened or crystalline deposits which are often present in cooling water systems.

Chelating agents have been used to prevent and remove iron oxide scales by sequestration Ethylenediaminetetraacetic acid has been used to remove iron oxide scale (U.S. Pat. No. 2,396,938), but it is effective only in the absence of excess calcium, a common condition encountered in cooling systems and the like. Its use can also lead to increased corrosion. Organophosphonates such as aminotrimethylenephosphonic acid (ATMP) have been shown to sequester iron(III) and thereby keep it soluble up to pH=10 (Dequest, Technical Bulletin 1-247, Monsanto, 1972). However, it is known that these organophosphonates will, in general, not dissolve iron oxide or iron hydroxide solids in water containing high concentrations of calcium ions at pH of 8 or above. These water conditions are typical for normal operation of a cooling water system and the like. In addition, these organophosphonates have been found to precipitate with high levels of calcium, precluding their use for iron-scale control in high hardness waters.

It is highly desired to have a means of dislodging and removing built up iron corrosion product and to disperse and dissolve them while further preventing such product formation of systems in which aqueous and iron or iron based alloy materials are in contact.

SUMMARY OF THE INVENTION

The present invention is directed to a method for removing formations of iron corrosion products in systems presenting an aqueous/iron or iron base alloy interface, in particular to cooling water or heat exchange systems and, thus, presents a means of clearing the systems of such products.

The present method requires introducing and maintaining within the aqueous component of the system at least one aromatic compound having two hydroxyl groups positioned ortho as adjacent-paired with respect to each other and at least one electron withdrawing group substituted for a hydrogen atom of the aromatic group.

DETAILED DESCRIPTION

The present invention is directed to a soluble additive for cleaning cooling water systems of iron scale formation and the like.

It has now been unexpectedly found that certain dihydroxy-aromatic compounds, which also contain electron-withdrawing substituents provide all of the desired properties as described in the Background of the Invention. The combination of paired hydroxyl groups and at least one electron-withdrawing group are essential for maintaining these dihydroxy aromatic additives as stable and soluble materials having the ability to effectively remove the unwanted iron contaminant solids under cooling water conditions.

The compound required to be used in the present process will be described herein and in the appended claims as an aromatic compound having adjacent-paired dihydroxy groups or ortho dihydroxy groups as well as at least one electron withdrawing group directly attached to the same aromatic moiety. The term "paired" or "ortho" as used herein and in the appended claim refers to the positioning of two hydroxy groups on adjacent carbon atoms of a single benzylic ring.

The compounds required to be used according to the method of the present invention are aromatic compounds containing paired hydroxyl groups and containing at least one electron withdrawing group. The term "aromatic" as used in this description and in the appended claims shall, unless specifically indicated otherwise, refer to benzylic compounds. The term "electron-withdrawing group" refers herein and in the appended claims to any group which has an electron-withdrawing inductive effect which is known to intensify a positive charge and destabilize a carbonium ion of the aromatic group. Suitable electron-withdrawing groups include —$SO_3H$, SOR, $SO_2R$, —$NO_2$, —F, —Cl, —Br, —CHO, —$COCH_3$, —COR, —$CONH_2$, —CONHR, $CONR_2$, —$CO_2H$, —$PO_3H_2$ and the like (where R=an alkyl group). The preferred groups are sulfonyl, carboxyl and nitro groups. Examples of the subject compounds are 3,4-dihydroxybenzenesulfonic acid (catechol-4-sulfonic acid), 4-nitro-1,2-benzenediol, 3,4-dihydroxybenzoic acid, 4,5-dihydroxy-1,3 benzene disulfonic acid (catechol-3,5-disulfonic acid) and the like and salts of said acids. The salts are preferably formed from alkali and alkaline earth metals. The required compound can be represented by the formula:

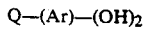

Q—(Ar)—(OH)$_2$ wherein Ar represents a benzene aromatic moiety, Q represents at least one electron withdrawing group substituted on the aromatic moiety and the hydroxyl groups are in paired position on the benezene aromatic Ar group.

These aromatic compounds may be used in combination with known water treatment additives such as chelants, scale inhibitors, pH regulating agents, dispersants, biocides and/or corrosion inhibitors and mixtures thereof. Examples of chelants are N,N,N',N' ethylenediamine tetraacetic acid and N,N'-bis(2-hydroxybenzyl) ethylenedinitrilo-N,N'-diacetic acid. Examples of pH regulating agents are mineral acid (e.g., $H_2SO_4$), organic acids (acetic acid), base (e.g., NaOH) and various buffers (e.g., phosphates or borates). Examples of scale inhibitors are organophosphonates as, for example, aminotrimethylenephosphonic acid and hydroxyethylidene-1, 1-diphosphonic acid as well as polyacrylates. Examples of dispersants include carboxylate and sulfonate containing polymers. Examples of biocides are chlorine- and bromine-containing materials and quaternary ammonium salts. Examples of corrosion inhibitors suitable for use herein are inorganic acids (i.e. phosphoric acid) organic acids (i.e. citric, HEDPA) and salts of these acids such as, phosphates, organophosphonates, chromates, molybdates, and zinc salts.

The method of this invention for removing iron-based scale in cooling water and the like systems comprises maintaining in the aqueous liquid from 0.1 to 50,000 parts per million ("ppm"), preferably 1 to 2000 ppm and most preferably 5 to 200 ppm of at least one of the subject paired dihydroxy aromatic compounds (single or multi-component). When the subject agents are used to slug clean (quick clean a corrosion containing system) the agents are normally used in from about 500 to 5000 ppm and the system is maintained at a pH of from about 6 to about 9.5 (preferably about 6 to 8). When one desires to maintain a system free of iron contaminants, the subject compounds are maintained in the system in concentrations of from about 2 to 20 parts per million with the pH being from 7.5 to 9.5 (preferably less than 8). The temperature of the system being treated should be maintained from ambiant to about 200° F. and preferably up to 160° F. The treatment composition employed for this invention can be added to the water by conventional bypass feeder using biquettes containing the treatment, by adding the compounds either separately or together as dry powder mixtures to the water, or it can be fed as an aqueous feed solution containing the treatment components.

Another embodiment of the present invention is the utilization of the subject paired dihydroxy aromatic compounds in combination with conventional calcium scale inhibitors, such as exemplified above. Such scale inhibitor agents do not normally provide the desired inhibiting characteristics when the system being treated contains iron contaminants. In turn, conventional agents used to prevent and remove iron are not normally effective in the presence of calcium and known calcium scale inhibiting agents.

It has unexpectedly been found that conventional calcium scale inhibitors, such as, for example, organophosphonates and polyacrylates, can act effectively and efficiently in the presence of the present paired dihydroxy aromatic agents when the system being treated contains iron contaminants. In turn, the subject aromatic agents can exhibit effective removal of iron contaminants when used with calcium scale inhibitors. The calcium inhibitor and pair dihydroxy aromatic agent can be used in weight ratios of from about 1:50 to 50:1, preferably from about 1:10 to 10:1. The calcium inhibitor is most preferably maintained in from about 0.1 to 10 ppm in the liquid of the system being treated. The exact amount will depend on the amounts of each contaminant present and can be determined by routine experimentation.

The use of dihydroxy aromatic compounds, which contain electron-withdrawing substituents (either alone or in combination with known additives for cooling water) in aqueous solution, controls iron scale in cooling water systems. The result is to maintain equipment free from obstruction, maximize flow rates and heat transfer, and minimize corrosion and biological fouling.

The following examples are given for illustrative purposes only and are not meant to be a limitation on the present invention as defined by the claims. All parts and percentages are by weight unless otherwise specified.

Examples 1-10

Test water was prepared and contained 99 parts per million (ppm) $CaSO_4$, 13 ppm $CaCl_2$, 55 ppm $MgSO_4$ and 176 ppm $NaHCO_3$. To 48.5 ml of this test water was added a solution of 5.1 mg of $FeCl_3 \cdot 6H_2O$ in 1.5 ml of water. While stirring vigorously, the pH was adjusted to 8.1 with NaOH(aq) and then stirred for 2 hours. This resulted in the precipitation of an iron-containing solid, presumably $FeO(OH) \cdot nH_2O$. A second solution was prepared to contain 100 ppm of the additive (as listed in Table I) in 50 ml of the test solution at pH 8.1. The two solutions were combined, and the mixture was stirred at 54° C. for 17 hours. The mixture was then filtered through a 0.1 micron membrane, and the amount of dissolved iron was determined by atomic absorption. Results are listed in Table I. Examples 1-6 are not part of the present invention but are included for comparative purposes.

TABLE I

| Example | Additive (50 ppm) | Dissolved Iron (ppm) |
|---|---|---|
| 1 | none | 0.1 |
| 2 | Ethylenediaminetetraacetic acid | 0.25 |
| 3 | Diethylenetriaminepentaacetic acid | 0.61 |
| 4 | Hydroxyethylidene-1,1-diphosphonic acid | 0.37 |
| 5 | Aminotrimethylenephosphonic acid | 0.38 |
| 6 | Catechol | 0.38 |
| 7 | Catechol-4-sulfonic acid | 4.8 |
| 8 | 4-nitrocatechol | 5.3 |
| 9 | Catechol-3,5-disulfonic acid | 6.8 |
| 10 | 3,4-dihydroxybenzoic acid | 2.3 |

From the results given above it is clearly evident that the method using the presently required compounds provides a far superior means of dissolving iron solids than representative known materials conventionally used for this purpose.

Examples 11-15

A solution of 50 ppm of the additive in the test water at pH 8.1 was combined with 1000 ppm $Fe_2O_3$ (hematite, particle size=0-10 microns). This mixture was stirred for 17 hours at 54° C., then allowed to settle, undisturbed for 1 hour. A sample as removed at 50% depth and analyzed for Fe by atomic absorption (after dissolution with HCl). Results are listed in Table II.

Examples 11-13 are not part of the present invention but are included for comparative purposes.

TABLE II

| Example | Additive (50 ppm) | Dispersed $Fe_2O_3$ (ppm) |
|---|---|---|
| 11 | none | ≦30 |
| 12 | Diethylenetriaminepentaacetic acid | ≦30 |
| 13 | Aminotrimethylenephosphonic acid | ≦30 |
| 14 | Catechol-4-sulfonic acid | 460 |
| 15 | Catechol-3,5-disulfonic acid | 580 |

Example 16

Weighed mild steel coupons were pre-corroded by suspending vertically above an aerated saline solution (1% NaCl) for 24 hours. This process was found to give a deposit weight of 700 mg±15%. Two pre-corroded coupons were suspended in a tall form beaker containing 900 ml of the solution under test. The test solution having a pH of 7.0-7.5 contains 500 ppm $Ca^{2+}$, 100 ppm $Mg^{2+}$, and 500 ppm $HCO_3^-$, all as $CaCO_3$. The solution was stirred for 3 hours at 500 r.p.m., 25° C. At the end of this period the coupons were removed and a 50 $cm^3$ sample of solution taken. This sample was filtered through a 0.2 micron filter paper, acidified with two drops of 1:1 HCl and analyzed for total iron with atomic absorption. The steel coupons were dried at 100° C. for 1 hour and weigh ed. The coupons were then cleaned with inhibited HCl, washed with water and acetone and reweighed in order to determine the final weight of deposit. The results of this test are expressed in terms of both soluble iron and also the percentage of deposit removal.

TABLE III

| Additive | Dosage, ppm | Deposit Removal % | Soluble Fe, ppm |
|---|---|---|---|
| Blank | 0 | 0 | 0.1 |
| Catechol-4-sulfonic acid | 1,500 | 62 | 75 |
| Catechol-3,5-disulfonic acid | 1,500 | 56 | 114 |

Table III illustrates the capability of the presently required compounds to remove rust in hard water.

Examples 17-19

All iron interference tests for calcium carbonate threshold inhibitors were performed in the following water: $MgSO_4.7H_2O$ 266.1 ppm; $CaCl_2$ 234.8 ppm; $CaSO_4.\frac{1}{2}H_2O$ 199.9 ppm; $Na_2SO_4$ 91.5 ppm; and $NaHCO_3$ 498.3 ppm.

The test solution was prepared by adding to a 1000ml beaker, 1 ppm of hydroxyethylidene-1,1-diphosphonic acid (HEDPA) to the above water followed by the indicated amount of additive of Table IV and then in turn 1 ppm of ferrous ion obtained from an aqueous solution of ferrous sulphate. The total volume of the solution was made up to 750 ml. The solution was stirred at 500 rpm and heated in a water bath to 60° C. The pH of the solution was monitored and kept below pH 7.3 with addition of dilute HCl. On achieving the required temperature 0.066N NaOH was added at a rate of 0.3 ml/min using an automatic titrator.

The pH was monitored and recorded during the titration. When calcium carbonate starts to precipitate a decrease or plateau in the pH is observed. This point is termed the critical pH. Threshold inhibitiors such as HEDPA act to increase the critical pH and thus decrease the scaling tendency of the water. When iron interferes with the HEDPA a decrease in its threshold activity is noted by a decrease in the critical pH. Results are summarized in Table IV. Example 17 is not part of the present invention but is included for comparative purposes.

TABLE IV

| Example | Additive | Critical pH for Additive Concentration of | | | |
|---|---|---|---|---|---|
| | | 0 ppm | 1 ppm | 5 ppm | 10 ppm |
| 17 | Ethylenediamine-tetraacetic acid | 8.70 | 8.70 | 8.70 | 8.70 |
| 18 | Catechol-4-sulfonic acid | 8.70 | 8.70 | 8.95 | 9.00 |
| 19 | Catechol-3,5-disulfonic acid | 8.70 | 8.75 | 9.10 | 9.00 |

HEDPA gave a critical pH value of 9.10 in the absence of ferrous ion and a critical pH value of 8.70 in the presence of ferrous ion, which represents a significant loss in threshold activity. Therefore, a critical pH reading of 8.70 shows 0% activity by the indicated additive for the removal of the iron interference, while a critical pH reading of 9.10 represents a 100% activity.

As shown in Table IV, ethylenediaminetetraacetic acid, a commonly used chelant, is completely ineffective for removing the iron interference for HEDPA, which is a calcium carbonate scale inhibitor. On the other hand, the addition of catechol-4-sulfonic acid or catechol-3,5-disulfonic acid at 5 ppm restored the majority of the threshold activity of HEDPA.

WHAT IS CLAIMED:

1. A method of removing iron contaminants from an aqueous system of comprising introducing an aqueous solution into the system and removing portions of the aqueous system containing said iron contaminants, said solution consisting essentially of water and at least one dihydroxylaromatic compound represented by the formula:

$$Q-(Ar)-(OH)_2$$

wherein Ar represents benzene aromatic moiety, Q represents at least one electron withdrawing group substituted on the Ar moiety, and the hydroxy (OH) groups are substituted on the Ar moiety in ortho position with respect to each other and said solution being introduced into said system in an amount to provide from 0.1 to 50,000 parts per million concentration of the compound within the system.

2. The method of claim 1 wherein the dihydroxyl aromatic compound is maintained at a concentration of from about 1 to 2000 ppm.

3. The method of claim 1 wherein the system has a pH of less than 9.5 and is maintained at a temperature of less than about 200° F.

4. The method of claim 1 wherein the dihydroxyl aromatic compound is introduced in said system to provide a concentration therein of from about 500 to 5,000 ppm and the system has a pH of from about 6 to 9.5.

5. The method of claim 1 wherein Q is selected from $SO_3H$, COOH, $NO_2$, metal sulfonate salts and metal carboxylate salts.

6. The method of claim 2 wherein Q is selected from $SO_3H$, COOH, $NO_2$, metal sulfonate salts and metal carboxylate salts.

7. The method of claim 3 wherein Q is selected from $SO_3H$, COOH, $NO_2$, metal sulfonate salts and metal carboxylate salts.

8. The method of claim 1 wherein the dihydroxy aromatic compound is selected from 3,4-dihydroxy benzenesulfonic acid, 3,4-dihydroxybenzoic acid, 4,5-dihydroxy-1,3-benzenedisulfonic acid, salts of said acids, and 4-nitro-1,2-benzenediol.

9. The method of claim 2 wherein the dihydroxy aromatic compound is selected from 3,4-dihydroxy benzenesulfonic acid, 3,4-dihydroxybenzoic acid, 4,5-dihydroxy-1,3-benzenedisulfonic acid, salts of said acids, and 4-nitro-1,2-benzenediol.

10. The method of claim 3 wherein the dihydroxy aromatic compound is selected from 3,4-dihydroxy benzenesulfonic acid, 3,4-dihydroxybenzoic acid, 4,5-dihydroxy-1,3-benzenedisulfonic acid, salts of said acids, and 4-nitro-1,2-benzenediol.

11. The method of claim 1 wherein the aqueous system further contains at least one water treatment agent selected from chelants, scale inhibitors, pH regulators, dispersants, biocides, corrosion inhibitors and mixtures thereof.

12. The method of claim 3 wherein the aqueous system further contains at least one water treatment agent selected from chelants, scale inhibitors, pH regulators, dispersants, biocides, corrosion inhibitors and mixtures thereof.

13. The method of claim 5 wherein the aqueous system further contains at least one water treatment agent selected from chelants, scale inhibitors, pH regulators, dispersants, biocides, corrosion inhibitors and mixtures thereof.

14. The method of claim 7 wherein the aqueous system further contains at least one water treatment agent selected from chelants, scale inhibitors, pH regulators, dispersants, biocides, corrosion inhibitors and mixtures thereof.

15. A method of cleaning solid iron(III) corrosion products from systems which present aqueous/iron or iron base alloy interface by introducing into the aqueous component of the system an aqueous solution consisting essentially of at least one dihydroxyaromatic compound represented by the formula:

$$Q-(Ar)-(OH)_2$$

wherein Ar represents a benzene aromatic moiety, Q represents at least one electron withdrawing group substituted on the Ar moiety, and each hydroxyl group is positioned ortho with respect to each other and contacting said aqueous component with the solid iron(III) product, said solution being introduced into said system in an amount to provide from 0.1 to 50,000 ppm of the compound within the system, having said solution dislodge and/or dissolve said products and removing portions of the aqueous system containing said corrosion products.

16. The method of claim 15 wherein the dihydroxyl aromatic compound is present in from about 1 to 2000 ppm.

17. The method of claim 15 wherein Q is selected from $-SO_3H$, $SO_2R$, SOR, $-COOH$, $NO_2$, $-F$, $-Cl$, $-Br$, $-CHO$, $-COR$, $-CONH_2$, $-CONHR$, $-CONR_2$, $-PO_3H_2$, metal sulfonate salts, and metal carboxylate salts and R is an alkyl group.

18. The method of claim 17 wherein Q is selected from SO$_3$H, COOH, NO$_2$ metal sulfonate salts and metal carboxylate salts.

19. The process of claim 15 wherein the aqueous component of the system further contains at least one water treatment agent selected from chelants, scale inhibitors, pH regulators, dispersants, corrosion inhibitors, biocides and mixtures thereof.

20. The process of claim 18 wherein the aqueous component of the system further contains at least one water treatment agent selected from chelants, scale inhibitors, pH regulators, dispersants, corrosion inhibitors, biocides and mixtures thereof.

21. The method of claim 15 wherein the dihydroxy aromatic compound is selected from 3,4-dihydroxy benzenesulfonic acid, 3,4-dihydroxybenzoic acid, 4,5-dihydroxy-1,3-benzendisulfonic acid, salts of said acids, and 4-nitro-1,2-benzenediol.

22. The method of claim 16 wherein the dihydroxy aromatic compound is selected from 3,4-dihydroxy benzenesulfonic acid, 3,4-dihydroxybenzoic acid, 4,5-dihydroxy-1,3-benzendisulfonic acid, salts of said acids, and 4-nitro-1,2-benzenediol.

23. A method for inhibiting calcium scale formation from aqueous systems rich in calcium comprising introducing into the aqueous system a solution consisting essentially of a calcium scale inhibitor and at least one dihydroxyaromatic compound in a weight ratio of about 1:50 to 50:1, said dihydroxylaromatic compound represented by the formula:

Q—(Ar)—(OH)$_2$ wherein Ar represents benzene aromatic moiety, Q represents at least one electron withdrawing group substituted on the Ar moiety, and the hydroxyl (OH) groups are substituted on the Ar moiety in ortho position with respect to each other and introduced into said system in an amount to provide from 0.1 to 50,000 parts per million concentration of the compound within the system.

24. The method of claim 23 wherein the dihydroxyl aromatic compound is present in from about 1 to 2000 ppm.

25. The method of claim 24 wherein the scale inhibitor is selected from organophosphonates and polyacrylates.

26. The method of claim 24 wherein Q is selected from SO$_3$H, COOH, NO$_2$, metal sulfonate salts and metal carboxylate salts.

27. The method of claim 25 wherein Q is selected from SO$_3$H, COOH, NO$_2$, metal sulfonate salts and metal carboxylate salts.

28. The method of claim 24 wherein the dihydroxy aromatic compound is selected from 3,4-dihydroxy benzenesulfonic acid, 3,4-dihydroxybenzoic acid, 4,5-dihydroxy-1,3-benzenedisulfonic acid, salts of said acids, and 4-nitro-1,2-benezenediol.

29. The method of claim 25 wherein the dihydroxy aromatic compound is selected from 3,4-dihydroxy benzenesulfonic acid, 3,4-dihydroxybenzoic acid, 4,5-dihydroxy-1,3-benzenedisulfonic acid, salts of said acids, and 4-nitro-1,2-benzenediol.

30. The method of claim 29 wherein the scale inhibitior and dihydroxyl aromatic compound are in a weight ratio of from about 1:10 to 10:1.

* * * * *

UNITED STATES PATENT AND TRADEMARK OFFICE
CERTIFICATE OF CORRECTION

PATENT NO. : 5,022,926

DATED : June 11, 1991

INVENTOR(S) : Robert P. Kreh, Joseph T. Lundquist, Wayne L. Henry, John A. Kelly and Vincent R. Kuhn It is certified that error appears in the above-identified patent and that said Letters Patent is hereby corrected as shown below:

In Column 4, line 43, delete "ambiant" and insert --ambient--.

In Column 6, Example 16, line 28, delete "weigh ed" and insert --weighed--.

In the Claims:

In Claim 1, Column 7, line 46, delete "hydroxy" and insert --hydroxyl--.

Signed and Sealed this

Nineteenth Day of January, 1993

Attest:

DOUGLAS B. COMER

*Attesting Officer*         *Acting Commissioner of Patents and Trademarks*